United States Patent
Langset

[11] Patent Number: 6,000,471
[45] Date of Patent: Dec. 14, 1999

[54] HOLE IN THE GROUND FOR TRANSFER OF GEOTHERMAL ENERGY TO AN ENERGY-CARRYING LIQUID AND A METHOD FOR PRODUCTION OF THE HOLE

[76] Inventor: Einar Langset, Torbjørn Hornklovesgate 43, N-4010 Stavanger, Norway

[21] Appl. No.: 08/875,449
[22] PCT Filed: Jan. 26, 1996
[86] PCT No.: PCT/NO96/00016
  § 371 Date: Aug. 28, 1997
  § 102(e) Date: Aug. 28, 1997
[87] PCT Pub. No.: WO96/23181
  PCT Pub. Date: Jul. 28, 1997

[30] Foreign Application Priority Data

Jan. 27, 1995 [NO] Norway .................................. 950306

[51] Int. Cl.⁶ .................................................. E21B 43/16
[52] U.S. Cl. ...................................... 166/268; 166/272.1
[58] Field of Search ................................. 166/268, 269, 166/50, 272.1; 175/72, 45

[56] References Cited

U.S. PATENT DOCUMENTS

| | | |
|---|---|---|
| 2,859,818 | 11/1958 | Hall et al. .............................. 166/269 |
| 3,199,588 | 8/1965 | Holbert ............................... 166/269 X |
| 3,470,943 | 10/1969 | Van Huisen . |
| 3,807,491 | 4/1974 | Van Hulsen . |
| 4,051,677 | 10/1977 | Van Huisen .......................... 166/45 X |
| 4,200,152 | 4/1980 | Foster et al. . |
| 4,223,729 | 9/1980 | Foster . |
| 4,290,266 | 9/1981 | Twite et al. . |
| 4,357,989 | 11/1982 | Holzle . |
| 5,515,679 | 5/1996 | Schulman .............................. 60/641.2 |

FOREIGN PATENT DOCUMENTS

| | | |
|---|---|---|
| 24 49 807 | 4/1976 | Germany . |
| 30 00 836 | 7/1980 | Germany . |
| WO 94/21889 | 9/1994 | WIPO . |

OTHER PUBLICATIONS

N.K. Prikhodko, "Rock geothermal energy extraction —by creating semicircular crushing zone, borehole formation and liquid heat carrier use", Abstract of SU 614314, Derwent's abstract, No. 38445 B/20 Week 7920, May 30, 1978.

*Primary Examiner*—Frank S. Tsay
*Attorney, Agent, or Firm*—Young & Thompson

[57] ABSTRACT

A hole in the earth for transferring geothermal energy from the earth around the hole to an energy carrier fluid which is introduced into the hole. The lower ends (7, 8) of at least two substantially vertically extending hole sections (2, 4) which have been used as wells for the recovery of oil or gas, are interconnected via an additional hole section (3).

2 Claims, 1 Drawing Sheet

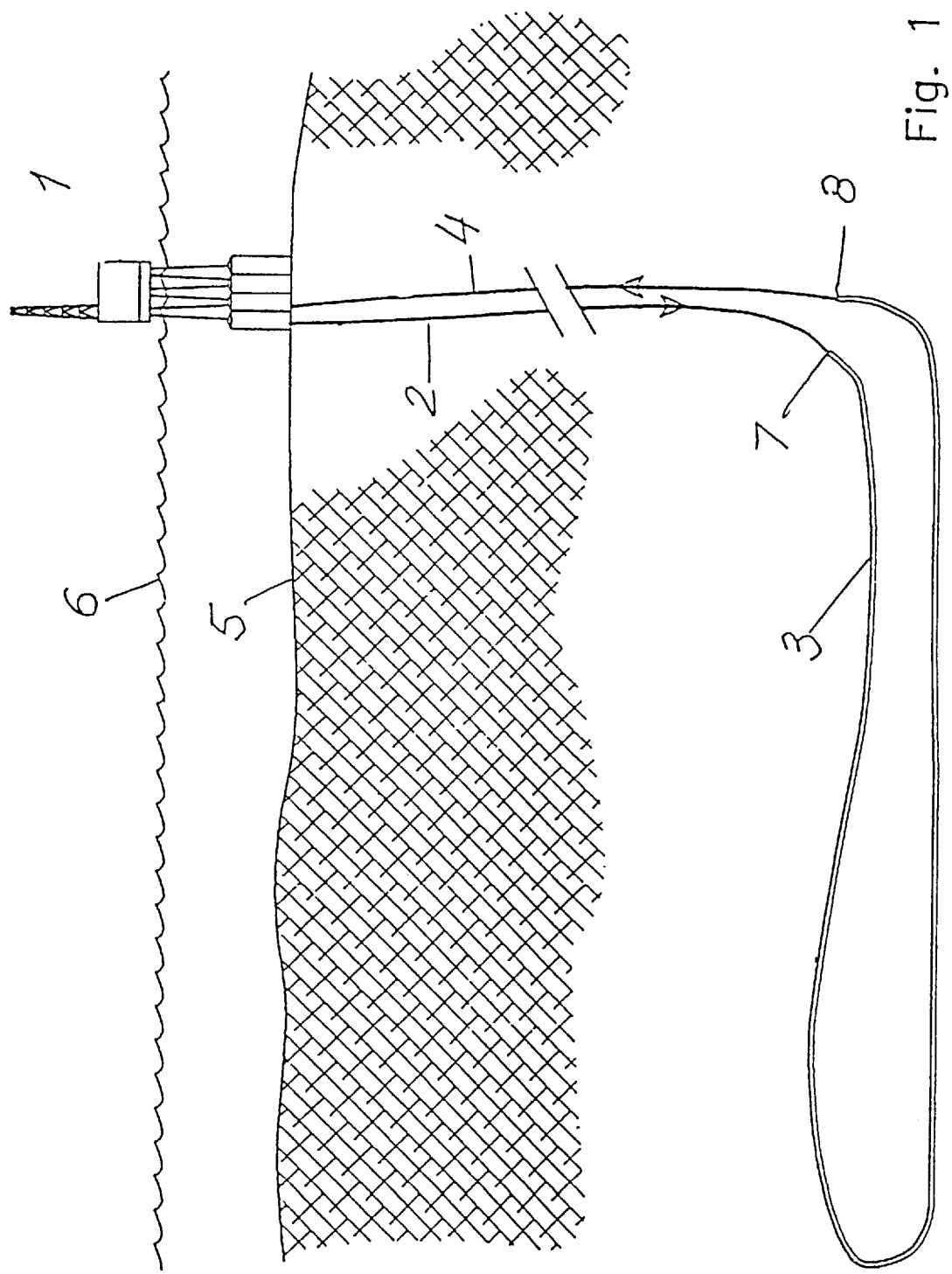

HOLE IN THE GROUND FOR TRANSFER OF GEOTHERMAL ENERGY TO AN ENERGY-CARRYING LIQUID AND A METHOD FOR PRODUCTION OF THE HOLE

This application is the 35 USC §371 National phase application of International application PCT/NO96/00016 which was filed on Jan. 26, 1996, and designated the United States of America.

FIELD OF THE INVENTION

The invention relates to a hole in the ground for transferring geothermal energy from the ground around the hole to an energy carrier fluid which is introduced into the hole.

BACKGROUND OF THE INVENTION

In U.S. Pat. No. 4,290,266 it is disclosed that a pipe loop can be placed in a blind bore in the earth and that a fluid can be passed down into the earth via a first section of the pipe loop and up from the earth via a second section of the pipe loop. A disadvantage of this prior art technique is that the said pipe loop sections extend very close to each other whereby upwardly flowing warm fluid is cooled by the cold, downwardly flowing fluid, with the result that the total efficiency is low.

Furthermore it is known that there are a number of deep bore holes or wells which have been used or are being used for the recovery of oil or gas together with associated installations above ground. As a consequence of the strain on the environment which these installations often represent, for environmental and other reasons increasing demands have been made for such installations to be removed or dismantled and the wells sealed after the oil or gas extraction has ceased, which is a very expensive process.

SUMMARY OF THE INVENTION

The object of the invention is to provide a hole of the above-mentioned type whereby the above-mentioned disadvantages can be avoided.

The characteristics of the hole according to the invention are presented by the characteristic features indicated in the claims.

BRIEF DESCRIPTION OF THE DRAWINGS

The invention will now be described in more detail with reference to the drawing whose only figure schematically illustrates a hole according to the invention.

DETAILED DESCRIPTION OF THE INVENTION

As illustrated in the figure there is located on the seabed 5 a platform 1 whose upper section projects up above the surface of the sea 6. From the seabed 5 near the platform there extend two substantially vertical hole sections, viz. a first hole section 2 and a third hole section 4 to locations 7 and 8 respectively in the ground formation from which oil or gas have been extracted and brought up via the hole sections 2,4.

Instead of removing the platform and sealing the hole sections 2,4 after the oil or gas recovery has ceased, it is proposed according to the invention that an additional or second hole section 3 should be drilled which connects the locations 7 and 8 to each other, thus providing a hole loop comprising the first, second and third hole sections 2,3 and 4 respectively.

By passing a suitable fluid, such as water, down into the first hole section 2, this fluid can flow on through the second hole section 3, where it is heated by the surrounding ground, and subsequently up through the third hole section 4, without the heated fluid in the third hole section 4 being cooled by the downwardly flowing, cold water which is passed down into the first hole section 2.

If the substantially vertical hole sections 2 and 4 extend from the same platform 1 as illustrated in the figure, the additional hole section 3 can extend in a relatively large loop away from one location 7 before it extends towards the second section 8, thereby ensuring that the fluid is heated to close to the temperature of the ground around the second hole section 3 before flowing upwards and out of the third hole section 4, even though the through-flow rate is high.

There can be provided on the platform a known per se installation (not shown) whereby the heat energy may be converted to another suitable energy form, e.g. electrical energy, and supplied to a consumer. This installation may comprise, e.g. heat exchangers, turbines, generators etc. and it is assumed that it will be familiar to a person skilled in the art.

As it will be understood, the invention permits a re-use of installations and wells, the decommissioning of which would have entailed major expenses for the owner. The invention provides energy whose release does not pollute the environment, and which is obtained from an almost inexhaustible source.

In order to illustrate the costs involved for the energy amount which can be provided, the following information is provided.

At a depth of between 3500 m and 6000 m below the seabed the temperature in the earth is approximately 110–180° C.

Two bore holes each having a length of approximately 3000 m for extracting oil or gas at present cost approximately NOK 150 million. An additional deviated hole which has a length of approximately 1000 m and which connects these two bore holes costs approximately NOK 20 million.

For example, the drilling field Statfjord B in the North Sea comprises approximately 40 wells which together with the platform will probably be closed down around the year 2003. By applying the invention, however, these wells could form part of 20 hole loops for the production of geothermal energy, and the platform could be used as the mounting location for the above-mentioned installation.

It will be understood that in the hole sections there can be inserted pipes in which the fluid can flow.

For this oilfield the following example can be used:

| | |
|---|---|
| Internal pipe diameter | 0.215 m |
| Volume of water | 700 m³/h |
| Water velocity | 5.32 m/s |
| Inlet temperature of the water upstream of the pump | 20° C. |
| Outlet temperature of the water downstream of the pump | 40° C. |
| Outlet temperature of the water from the well | 110° C. |
| Hole length | 7000 m |
| Pump power | 1.72 MW |
| Thermal power | 40 MW |

At a rough estimate this thermal power can provide an effective output of approximately 5 MW. The 20 hole loops in this oilfield would thus be capable of providing a total output of 100 MW electricity, subtracted the pump performance 20×1.75 MW=34.4 MW, which gives a total of 65.6 MW electricity Even though it has been stated in the above description of the invention that two hole sections have been interconnected by means of an additional hole section, it will be understood that more than two hole sections can be interconnected.

I claim:

1. Method of using at least two separate old wells for the extraction of hydrocarbons, for the extraction of geothermal energy, together with at least one new well section which has not previously been used for the extraction of hydrocarbons, each of said old wells having a lower section, the method comprising: interconnecting the new well section with the lower section of each of the old wells, and using the old wells for the transport of a heat exchange fluid down to and up respectively from the new well section, whereby the new well section is adapted to transport the heat exchange fluid from one well to the other, and then to a geothermal electricity power plant.

2. Method of extracting geothermal energy by using a first old well and a second old well, each of said old wells having previously been used for extracting hydrocarbons, each of said old wells having a lower end, the method comprising:

drilling at least one new well section;

interconnecting the new well section with the lower end of each of the old wells;

passing a heat exchange fluid sequentially down the first old well, through the new well section, and up the second old well, thereby obtaining a heated fluid; and transporting the heated fluid for use in a geothermal electricity power plant.

* * * * *